United States Patent
Nathan et al.

(10) Patent No.: US 11,631,105 B2
(45) Date of Patent: Apr. 18, 2023

(54) SYSTEM AND METHOD TO TRANSMIT CALL TO ACTION DATA FROM CAR RADIO TO MOBILE APPLICATION FOR USER FOLLOW-UP

(71) Applicant: PURPLE TECHNOLOGIES LLC, Carmel, IN (US)

(72) Inventors: Rajesh Nathan, Carmel, IN (US); Nirmala Nathan, Carmel, IN (US)

(73) Assignee: PURPLE TECHNOLOGIES LLC, Carmel, IN (US)

( * ) Notice: Subject to any disclaimer, the term of this patent is extended or adjusted under 35 U.S.C. 154(b) by 0 days.

(21) Appl. No.: 17/703,097

(22) Filed: Mar. 24, 2022

(65) Prior Publication Data
US 2022/0309530 A1 Sep. 29, 2022

Related U.S. Application Data

(60) Provisional application No. 63/165,380, filed on Mar. 24, 2021.

(51) Int. Cl.
*G06Q 30/02* (2012.01)
*G06F 16/95* (2019.01)
(Continued)

(52) U.S. Cl.
CPC ......... *G06Q 30/0244* (2013.01); *G06F 16/95* (2019.01); *H04L 67/025* (2013.01); *H04L 67/125* (2013.01); *H04L 67/53* (2022.05)

(58) Field of Classification Search
CPC combination set(s) only.
See application file for complete search history.

(56) References Cited

U.S. PATENT DOCUMENTS 8,583,484 B1 * 11/2013 Chalawsky ...... H04N 21/23424
725/60
9,654,239 B2 5/2017 Mittal et al.
(Continued)

FOREIGN PATENT DOCUMENTS

WO 2015/073065 A1 5/2015

OTHER PUBLICATIONS

Mobile Phone Computing and the Internet of Things: A Survey (Year: 2016).*
(Continued)

*Primary Examiner* — Gautam Ubale
(74) *Attorney, Agent, or Firm* — Ward Law Office LLC; Jacob M. Ward

(57) ABSTRACT

Advertisement systems may have an administration server, a broadcast system, a receiver, and a consumer device. The receiver may be configured to receive an advertisement with a call-to-action code. The receiver may also be configured to broadcast the advertisement with the call-to-action code to a consumer. The receiver may have an input mechanism. The consumer device may be in communication with the receiver and the administration server. The consumer device may be configured to receive the call-to-action code from the receiver when the consumer engages the input mechanism. The consumer device may include a software application. The software application may be configured to parse the call-to-action code with the administration server into call-to-action instructions. The software application may be further configured to permit the consumer to selectively integrate the call-to-action details into a third-party application on the consumer device.

14 Claims, 6 Drawing Sheets

(51) Int. Cl.
  *H04L 67/025* (2022.01)
  *H04L 67/125* (2022.01)
  *G06Q 30/0242* (2023.01)
  *H04L 67/53* (2022.01)

(56) References Cited

U.S. PATENT DOCUMENTS

| | | |
|---|---|---|
| 9,917,605 B2 | 3/2018 | Wang |
| 9,940,632 B2 | 4/2018 | Harb |
| 2010/0114580 A1* | 5/2010 | McClendon ............ G10L 15/26 704/E15.001 |
| 2012/0179536 A1 | 7/2012 | Kalb et al. |
| 2013/0067022 A1 | 3/2013 | Andersson et al. |
| 2013/0067510 A1 | 3/2013 | Ahanger et al. |
| 2014/0046775 A1* | 2/2014 | Harb ....................... G06F 16/60 705/14.66 |
| 2015/0199968 A1* | 7/2015 | Singhal ................ H04N 21/812 704/251 |
| 2016/0371749 A1 | 12/2016 | Liu et al. |
| 2017/0070789 A1* | 3/2017 | Liassides ......... H04N 21/44204 |
| 2017/0316454 A1 | 11/2017 | McConnell et al. |
| 2019/0130450 A1 | 5/2019 | Lamont |
| 2021/0035166 A1* | 2/2021 | Doumar .................. H04W 4/80 |

OTHER PUBLICATIONS

In-Depth Survey of Digital Advertising Technologies (Year: 2016).*
Adaptive Dynamic Radio Open-source Intelligent Team (ADROIT): Cognitively-controlled Collaboration among SDR Nodes (Year: 2006).*
Written Opinion of the International Searching Authority dated Jul. 19, 2022.

* cited by examiner

Formatted based on CSS/HTML

| Type | Tag (May change) | Input from server | Output Example in app |
|---|---|---|---|
| Phone # | PHN | 888 111 2222 | `<a href="tel:8881112222"></a>` |
| Address | ADD | Cupertino | `<a href="http://maps.google.com/maps?q=cupertino">Cupertino</a>` |
| Time and Date | TAD | Oct 11, 2020 (and other data) | ICS formatting based on client |
| Charity | CHR | https://www.unicef.org/ | `<a href="https://unicef.org/">the Unicef homepage</a>.</p>` |
| Others TBD | | | |

SYSTEM AND METHOD TO TRANSMIT CALL TO ACTION DATA FROM CAR RADIO TO MOBILE APPLICATION FOR USER FOLLOW-UP

CROSS-REFERENCE TO RELATED APPLICATIONS

This application claims the benefit of U.S. Provisional Application No. 63/165,380, filed on Mar. 24, 2021. The entire disclosure of the above application is incorporated herein by reference.

FIELD

The present disclosure relates to advertising and, more particularly, to user interactive advertising.

INTRODUCTION

This section provides background information related to the present disclosure which is not necessarily prior art.

Traditional advertising campaigns lack consumer engagement. For example, radio broadcasts are typically just audio recordings that are broadcast to a consumer during an advertisement break. Undesirably, these advertisements may be easily forgotten after airing, especially if the consumer is busy performing another task while listening, such as driving or working. Some advertisements have attempted to engage consumers by displaying or reciting website addresses that contain more information related to the advertisement. However, these advertisements still rely on the consumer remembering the website address after the advertisement has finished, which may be easily forgotten.

There is a continuing need for ways to broadcast advertisements that facilitate consumer engagement. It would be desirable to integrate various third-party applications to facilitate further consumer engagement.

SUMMARY

In concordance with the instant disclosure, ways of broadcasting advertisements for facilitating consumer engagement, which may integrate one or more third-party applications, have been surprisingly discovered.

In a certain embodiment, a system includes an administration server, a broadcast system, a receiver, and a consumer device. The broadcast system is in communication with the administration server, the receiver in communication with the broadcast system, and the consumer device is in communication with the receiver and the administration server. The administration server may be configured to receive call-to-action details for an outgoing message, generate a call-to-action code based on the call-to-action details, and transmit the call-to-action code to a broadcast system. The broadcast system may be configured to receive the call-to-action code from the administration server and transmit a message with the call-to-action code to a receiver. The receiver may be configured to receive the message with the call-to-action code and transmit the message with the call-to-action code to a consumer device. The receiver includes an opt-in mechanism configured to be selectively engaged by a consumer. The consumer device may have a software application configured to parse the call-to-action code with the administration server into call-to-action instructions. In certain embodiments, parsing the call-to-action code may occur at multiple levels. For example, parsing may occur at system hardware, at an application programming interface, at the consumer device, or at the administration server. The software application may be further configured for the consumer to selectively choose which call-to-action instructions to integrate into call-to-action details within a third-party application of the consumer device.

Systems in accordance with the present technology can further include various aspects. An application programming interface can be configured to upload the call-to-action details to the administration server. The administration server may be configured to generate a unique call-to-action code for the call-to-action details received at the administration server. The broadcast system may be one of a radio station, a television station, and a streaming service. In certain embodiments, the broadcast system includes a radio data system configured to transmit the message with the call-to-action code. In still certain embodiments, the message with the call-to-action code is an advertisement. The opt-in mechanism may comprise one of a pushable button and a remote control.

In certain embodiments, the call-to-action details include one or more TAG variables, where the software application is configured to categorize the call-to-action details based on the one or more TAG variables. The one or more TAG variables may comprise one or more of a phone number variable, an address variable, a charity variable, and a fundraiser variable. In certain embodiments, the consumer device comprises one of a smartphone, a tablet, and a personal computer. The administration server may be configured to collect and store data based on the call-to-action code parsed at the consumer device. In certain embodiments, the stored data is downloadable from the administration server.

In a certain embodiment, a method of using an advertisement system includes the steps of providing an advertisement system having an administration server, a broadcast system, a receiver including an opt-in mechanism, and a consumer device having a software application, transmitting, by the broadcast system, an advertisement with a call-to-action code including call-to-action details to the receiver, receiving, by the receiver, the advertisement with the call-to-action code, broadcasting, by the receiver, the advertisement with the call-to-action code to a consumer, selectively engaging, by the consumer, the opt-in mechanism of the receiver; transmitting, by the receiver, the call-to-action code to the consumer device, parsing the call-to-action code, by the software application and the administration server, to call-to-action instructions, and selectively allowing, by the consumer using the software application, call-to-action details to integrate into a third-party application.

Methods in accordance with the present technology can further include various aspects. The method may further comprise generating a unique call-to-action code for the call-to-action details received at the administration server. In certain embodiments, the method further comprises, at the software application categorizing the call-to-action details according to one or more TAG variables. In certain embodiments, the one or more TAG may vary based on the third-party application. The method may further comprise selectively engaging by the consumer to receive one or more of a current call-to-action code, a previous-call-to-action code, and a future call-to-action code. In certain embodiments, the one or more of the current call-to-action code, the previous call-to-action code, and the future call-to-action code are stored at a server. The method may further comprise parsing one or more stored call-to-action codes, by the software application and the administration server, the stored call-to-action code to call-to-action instructions, and selectively allowing, by the consumer using the software application, the call-to-action instructions to integrate the call-to-action details into a third-party application. In certain embodiments, the method further comprises at the software application, marking the call-to-action details as one of read and to be read.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 3 is a tabular depiction of TAG variables, labels, and corresponding information, in accordance with the present technology;

DETAILED DESCRIPTION

Figure 1:
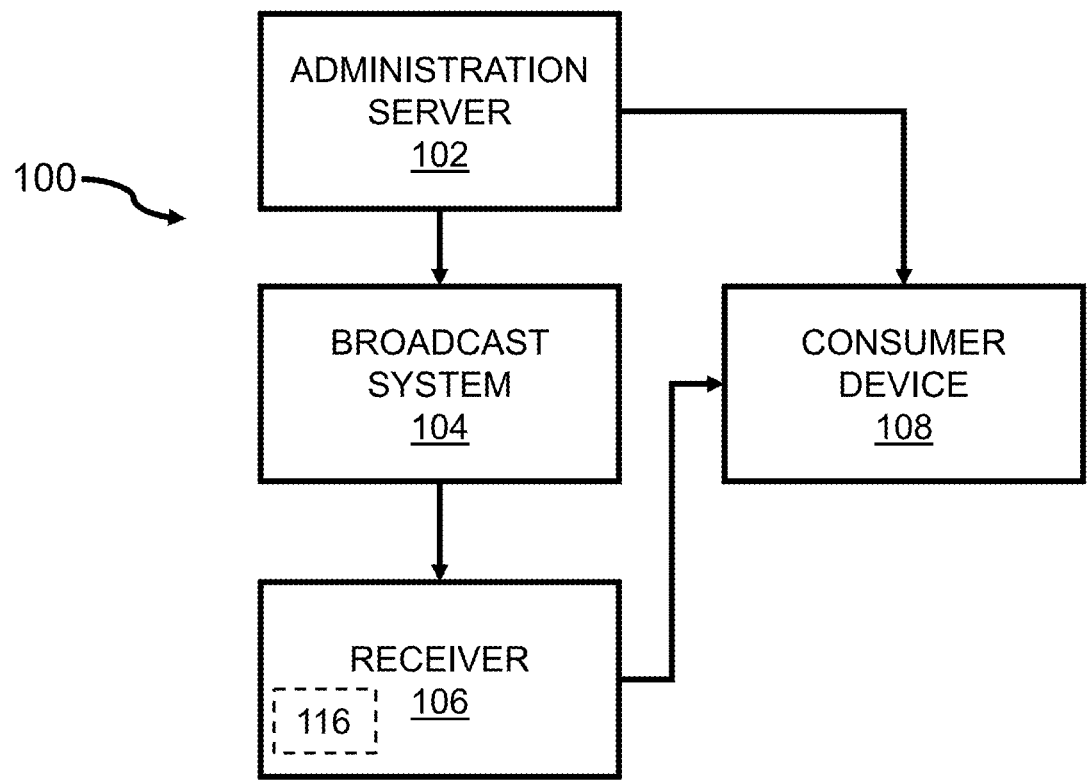
FIG. 1 is a schematic illustrating an embodiment of an advertisement system, in accordance with the present technology.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps may be different in various embodiments, including where certain steps may be simultaneously performed.

The terms "a" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

The present technology enables a user to access relevant information from a broadcast through a mobile application. The present technology makes the information available through a specific application with integrations to many standard applications. The present technology may enable a user to engage real time or pre-select to engage so that information is available for future use.

In certain embodiments, the present technology may include a Radio Data System (RDS). The RDS may send particularly formatted data to a radio using a FM frequency. The script may resemble HTML or CSS but may cover call-to-action parameters. In certain embodiments, the RDS may send data directly, without parsing the data at the administration server. In particular, it is contemplated that data may be sent according to any appropriately desired format or protocol. When the user engages, data may be handed off to a wireless integrated chip with minimal processing, and to a user's paired device. A mobile application on the paired device may parse through the data using predetermined logic to format the data and send to a proper integrated application. In certain embodiments, parsing may occur at multiple levels. For example, parsing may occur at system hardware, at an application programming interface, at the consumer device, or at the administration server. Based on appropriate privacy settings, the application may also allow the user to notify the advertiser to establish contact.

In certain embodiments, for example, an advertisement for a dentist may play on the radio. When the user engages, RDS or other appropriate protocol may send data, for example, a phone number of the dentist. The RDS or other appropriate protocol may send this information to the user's paired device, which may then identify the call-to-action. In this case, the application may add a phone call to the dentist to the integrated calendar application on the user's mobile device.

In accordance with the present technology, systems are provided for broadcasting advertisements to facilitate consumer engagement, where such systems may include an administration server, a broadcast system, a receiver, and a consumer device. The system components may be arranged to communicate with each other in various ways. Likewise, the system components may include particular aspects to optimize utility of the advertisement system for consumer engagement and interaction with advertising.

The administration server may be configured to receive call-to-action details based on an advertisement from an authorized user. The administration server may also be configured to generate a call-to-action code based on the call-to-action details. The administration server may be further configured to transmit the call-to-action code to the broadcast system. The broadcast system may be in communication with the administration server. The broadcast system may be configured to receive the call-to-action code from the administration server. The broadcast system may be also configured to transmit the advertisement with the call-to-action code to the receiver.

The receiver may be in communication with the broadcast system. The receiver may be configured to receive the advertisement with the call-to-action code. The receiver may also be configured to broadcast the advertisement with the call-to-action code to a consumer. The receiver may have an input mechanism. The input mechanism may be configured to be selectively engaged by the consumer.

The consumer device may be in communication with the receiver and the administration server. The consumer device may be configured to receive the call-to-action code from the receiver when the consumer engages the input mechanism. The consumer device may include a software application. The software application may be configured to parse the call-to-action code with the administration server into call-to-action instructions. The software application may be further configured to permit the consumer to selectively allow the call-to-action instructions to integrate call-to-action details into a third-party application on the consumer device.

In certain embodiments, methods for using such advertisement systems are provided. The broadcast system may transmit the advertisement with the call-to-action code to the receiver. The receiver may receive the advertisement with the call-to-action code. The receiver may broadcast the advertisement with the call-to-action code to the consumer. The consumer may selectively engage the input mechanism of the receiver. The receiver may transmit the call-to-action code to the consumer device. The software application and the administration server may parse the call-to-action code to the call-to-action instructions. The consumer, using the software application, may selectively allow the call-to-action instructions to integrate the call-to-action details into the third-party application.

The present technology may be used for radio broadcasts. However, it should be appreciated that a skilled artisan may adapt the present technology to other mediums, within the scope of this disclosure. For example, advertisements broadcast through television, a streaming service, or other broadcast service may be employed.

Advantageously, the advertisement system and method may facilitate consumer engagement by transmitting the call-to-action code to the consumer device. Desirably, the call-to-action details may be integrated into one or more third-party applications to facilitate further consumer engagement. In certain embodiment, data may be parsable without a code. For example, a song purchase may be initiated from an application of the consumer device when that song is played on the consumer device.

Examples

Example embodiments of the present technology are provided with reference to the several figures enclosed herewith.

With reference to FIG. 1, an advertisement system 100 system is shown. The advertisement system 100 includes an administration server 102, a broadcast system 104, a receiver 106, and a consumer device 108. The broadcast system 104 is in communication with the administration server 102 and the receiver 106. The consumer device 108 may be in communication with the receiver 106 and the administration server 102. In certain embodiments, the advertisement system 100 enhances an advertisement by permitting a consumer to selectively receive data concerning an advertisement or other broadcast. In certain embodiments, this may be done while the advertisement is being played and after the advertisement has been played. In certain embodiments, the advertisement is a radio advertisement. However, it is contemplated that the advertisement may include any appropriately desired advertisement, such as a television advertisement or an over-the-top (OTT) advertisement from a streaming service. In certain embodiments, the advertisement system 100 may be configured to enhance a broadcast other than an advertisement. For example, the advertisement system 100 may allow the user to selectively receive data concerning a news program or an interview. In particular, the advertisement system 100 may be configured to permit a consumer to selectively receive data concerning any appropriately desired broadcast which may trigger a user action, response, or where a user may desire further information.

Figure 2:
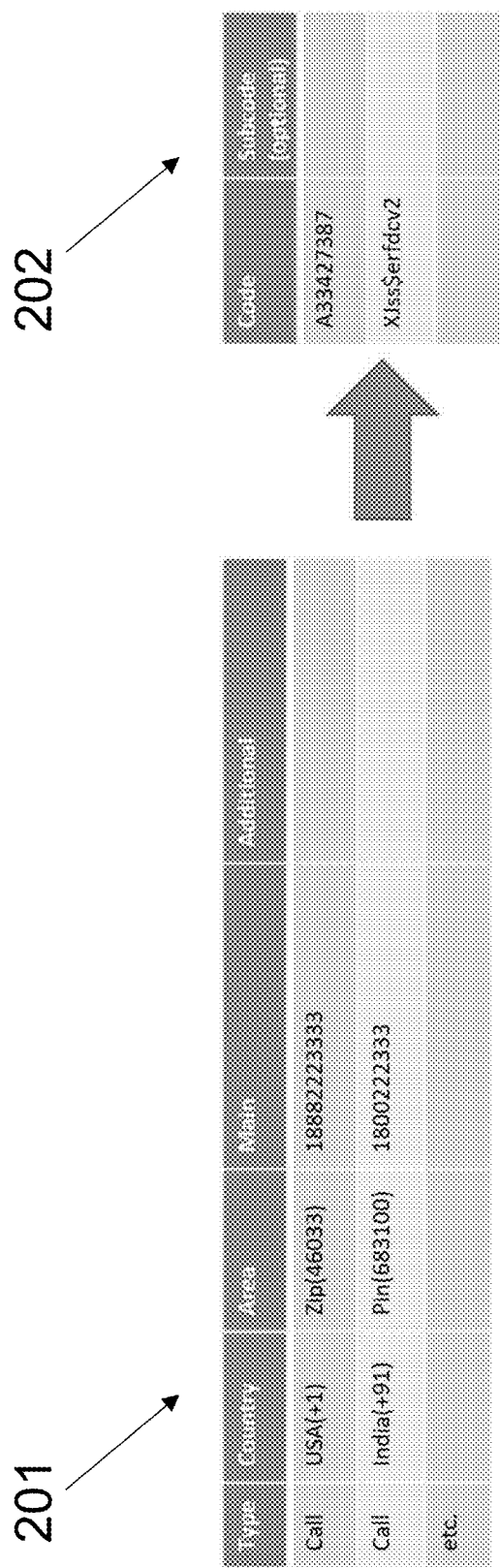
FIG. 2 is a tabular depiction of call-to-action details and corresponding call-to-action codes, in accordance with the present technology.

The administration server 102 may be configured to receive one or more call-to-action details 201 (FIG. 2). In certain embodiments, an authorized user may use an application programming interface (API) to semi-automatically or automatically transmit the call-to-action details 201 to the administration server 102. It should be appreciated that one skilled in the art may employ other methods for transmitting the call-to-action details 201 to the administration server 102. The authorized user may include an authorized person from an advertisement agency, a radio station employee, or other authorized person. In certain embodiments, the authorized person has call-to-action details 201 for an advertisement, which is uploaded to the administration server 102. In certain embodiments, the number of authorized users is limited within the advertisement system 100 to prevent the administration server 102 from being loaded with too much or false information. However, it should be appreciated that any appropriate authorized user may be selected as appropriately desired.

The administration server 102 is configured to generate a call-to-action code 202 (FIG. 2) based on the call-to-action details 201. Desirably, this may convert the call-to-action details 201 to the call-to-action code 202. The call-to-action code 202 may include instructions for integration with one or more third-party applications. In addition, the encoding may also provide security for proprietary details within the call-to-action details 201. It should be appreciated that a person skilled in the art may employ other features and aspects for the encoding, as desired. In certain embodiments, a unique call-to-action code 202 is generated for the call-to-action details 201 that are received by the administration server 102. The call-to-action code 202 may include one or more encoded call-to-action details 201.

The administration server 102 is configured to transmit encoded-call-to-action details 201 to the broadcast system 104. In certain embodiments, the administration server 102 is configured to automatically transmit encoded-call-to-action details 201 to the broadcast system 104. Alternatively, in certain embodiments the call-action details 201 are manually uploaded and/or transmitted to the broadcast system 104. The broadcast system 104 may include a radio station, a television station, and/or an internet streaming service. In particular, the broadcast system 104 may include any appropriate system for transferring content to an end user device. In certain embodiments, the broadcast system 104 may also be the entity that selects the authorized user. It should be appreciated that a skilled artisan may select other entities to be the broadcast system 104, as described within the scope of this disclosure. The broadcast system 104 is configured to receive the encoded call-to-action details 201 from the administration server 102. In certain embodiments, the encoded call-to-action details 201 are synchronized with a corresponding advertisement. The call-to-action details 201 may include the information that the consumer would need to make a purchase. For example, the call-to-action details 201 may include a phone number for a sales representative that relates to the advertisement. Other non-limiting examples may include an address for a business, a day that a sale is taking place, an ecommerce link for a product, banking information needed to make a charity donation, and music or song information. In certain embodiments, the call-to-action details 201 may be categorized based on the code for the call to action detail. In certain embodiments, the call-to-action details 201 may be categorized based on according to the protocol format of the code. In certain embodiments, as shown in FIG. 3, the call-to-action details 201 may include a variable referred to herein as TAG. The TAG variable 301 may category the particular type of call-to-action detail 201. For example, the TAG variable 301 may be labeled as PHN to categorize the call-to-action detail as a phone number. The TAG variable 301 may include labels, such as CHR for charity and TAD for time and date As would be understood by someone of ordinary skill in the art, the TAG variable 301 may include any appropriately desired label and information to categorize the particular call-to-action detail. It should also be appreciated that one skilled in the art may select other information to be included in the call-to-action details 201, within the scope of this disclosure.

As shown in FIG. 1, the broadcast system 104 is in further communication with a receiver 106. The receiver 106 may include a device such as a radio and a television, or other device capable of receiving content and/or a signal from the broadcast system 104. In particular, the broadcast system 104 is configured to send the call-to-action code 202 to the receiver 106 with other transmitted content, such as an advertisement or other message. Alternatively, the broadcast system 104 may send the call-to-action code 202 to the receiver 106 separately from other transmitted content. The advertisement may be embedded with the call-to-action code 202. For example, the call-to-action code 202 may be embedded within the advertisement using scripting. In certain embodiments, the broadcast system 104 includes an RDS, which is configured to transmit an advertisement with the call-to-action code 202.

In certain embodiments, the broadcast system 104 may include internet radio or other appropriately desired streaming services. Alternatively, or in conjunction, the content may be received from a virtual reality platform or an interactive billboard. In certain embodiments, the data of the administration server 102 may be available such that an internet search provider may integrate the content with a search based on the content. In particular, the call-to-action code 202 may be integrated with any appropriately desired transmitted content and/or service.

The RDS is a communications protocol standard for embedding small amounts of digital information in conventional FM radio broadcasts. RDS standardizes several types of information transmitted, including time, station identification and program information. It should be appreciated that a skilled artisan may employ other methods for transmitting an advertisement with a call-to-action code 202 to the receiver 106, as appropriately desired.

The receiver 106 is configured to receive the advertisement including a call-to-action code 202 from the broadcast system 104. The receiver 106 may also broadcast the advertisement with the call-to-action code 202 to the consumer device 108. The receiver 106 may comprises a radio or car radio, a television, or other device. In certain embodiments, the broadcast system 104 may broadcast the advertisement with the call-to-action code 202 directly to the consumer device 108. The receiver 106 may include an input mechanism 116. For example, the input mechanism 116 may comprise a pushable button or controller, such as a radio remote control or a television remote control. However, it should be recognized that the input mechanism 116 may comprise another input mechanism as appropriately desired. In certain embodiments the input mechanism 116 may allow an end user to opt-in to receive content at the consumer device 108.

In certain embodiments, when the input mechanism 116 is engaged by a consumer, the consumer device 108 is configured to receive the call-to-action code 202 from the receiver 106. In certain embodiments, engaging the input mechanism 116 permits the call-to-action code 202 associated with the currently playing advertisement to be transferred to the consumer device 108. The input mechanism 116 may also be configured to cause the call-to-action code 202 associated with the current advertisement and a prior call-to-action code 202 associated with the advertisement that came before the current advertisement to be transferred to the consumer device 108 if the input mechanism 116 is activated twice. The input mechanism 116 may be further configured to transfer all the call-to-action codes 202 that have been broadcasted by the receiver 106 within a set amount of time. For example, if the input mechanism 116 is activated by a series of quick continuous presses. In certain embodiments, the set amount of time may include the last five minutes of all call-to-action codes. It should be appreciated that a skilled artisan may use the input mechanism to activate other features associated with the present technology, as desired.

In certain embodiments, the consumer device 108 comprises a device such as a smartphone, a tablet, a personal computer, or other appropriately desired device for receiving an embedded signal. The consumer device 108 may include a software application for receiving the call-to-action code 202. The software application may be configured to parse the call-to-action code 202 with the administration server 102 into the call-to-action instructions. In certain embodiments, the software application is configured to permit a consumer to selectively allow the call-to-action instructions to integrate the call-to-action details 201 into one or more third-party applications of the consumer device 108. For example, a phone number may be integrated with a calling application, which may allow the consumer to call the business associated with the advertisement. In other embodiments, an address may be integrated with a GPS application, which gives the consumer directions to a business associated with the advertisement. In still certain embodiments, a time-related entry may be integrated with a calendar of the consumer device 108, charity items may be integrated with a banking application, and home shopping items may be integrated with a shopping application. In particular, the call-to-action instructions or details may be integrated with any appropriately desired application of the consumer device 108. For example, in certain embodiments, a song may integrate with a music application.

A TAG variable may be used by a software application of the consumer device 108 to determine an appropriate third-party application to be integrated with the call-to-action details 201. It should be appreciated that a person skilled in the art may employ less or more types of integration for the consumer device 108, within the scope of this disclosure.

A software application of the consumer device 108 may include a graphical user interface (GUI) to permit the consumer to interface with the software application and the call-to-action details 201. In certain embodiments, The GUI may allow the consumer to perform several different actions. For example, the GUI may permit the consumer to selectively allow the call-to-action instructions to integrate the call-to-action details 201 into the third-party application. In addition, the GUI may allow the consumer to delete, mark as read, or mark as remind later with respect to the call-to-action instructions and details. The GUI may also permit the consumer to perform bulk options, such as initiating many call-to-action instructions at the same time and logic to allow sequential processing. In certain embodiments, the GUI may further permit the consumer to set reminders to review the embedded messages, customize which third-party application gets interrogated (e.g., WALMART® application or AMAZON® application), and/or request a call back from someone associated with the advertisement. Based on a choice of the consumer, the software application may be configured to automatically integrate the call-to-action details 201 into the third-party application.

In certain embodiments, the administration server 102 is configured to collect data based on the call-to-action codes parsed at a consumer device 108. In this manner, the administration server 102 may collect data based on an advertisement. The administration server 102 may store the data including number of views, number of downloads, and other values such as number of conversions to a sale, donation, or other metric. An advertisement agency, company, or other authorized user may collect this data from the administrative server 102 to improve future advertisements. In certain embodiments, one or more rules of the advertisement system 100 or the administrative server 102 may dictate who may download the data from the administrative server 102. The collected data may include how many consumers and in which areas requested decoding. In certain embodiments, the administration server 102 may also provide individual level data to the authorized user for directly contacting a specific consumer. It should be appreciated that one skilled in the art may select other information to be included in the collected data.

Figure 4:
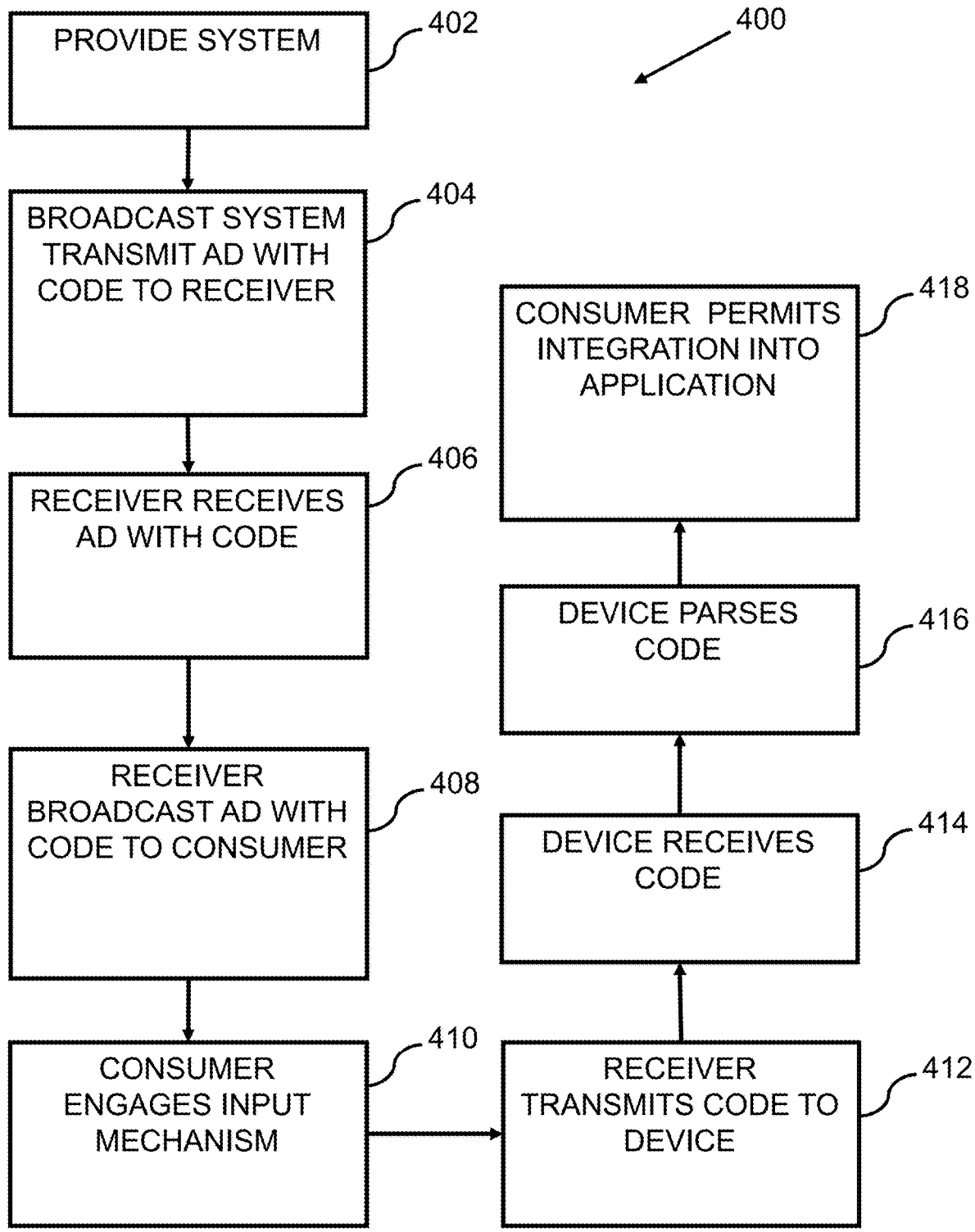
FIG. 4 is a flowchart of an embodiment of a method of using the advertisement system, in accordance with the present technology.

FIG. 4 shows a flowchart of a method of using the advertisement system 100 in accordance with a first embodiment. The method 400 may include a step 402 of providing the advertisement system 100. In a step 404, the broadcast system 104 may transmit an advertisement with a call-to-action code 202 to the receiver 106. The receiver 106 may receive the advertisement with the call-to-action code 202 in a step 406. In a step 408, the receiver 106 may broadcast the advertisement with the call-to-action code 202 to a consumer. The consumer may selectively engage an input mechanism of the receiver 106, in a step 410. If the consumer does not engage the input mechanism, then the receiver 106 continues to wait for the consumer to engage the input mechanism 116. In a step 412, the receiver 106 transmits the call-to-action code 202 to the consumer device 108 if the consumer engages the input mechanism 116. The consumer device 108 may receive the call-to-action code 202, in a step 414. The software application may parse the call-to-action code 202 to the call-to-action instructions in a step 416. As mentioned previously, in certain examples, the administration server 102 may assist the software application in parsing the call-to-action code 202. In a step 418, the consumer may selectively allow, by using the software application, the call-to-action instructions to integrate the call-to-action details 201 into the third-party application.

Figure 5:
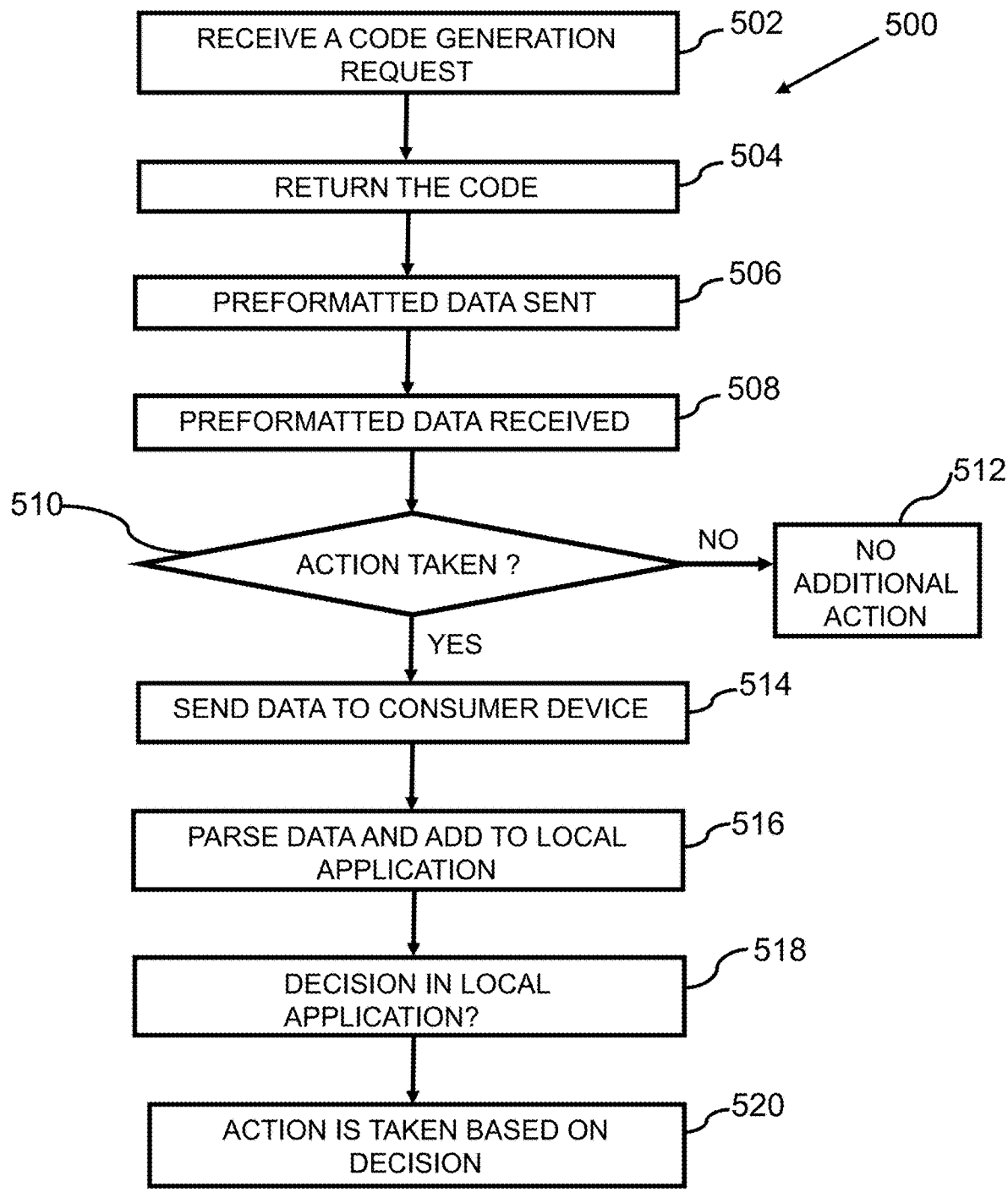
FIG. 5 is a flowchart of another embodiment of a method of using the advertisement system, in accordance with the present technology.

FIG. 5 shows a flowchart of a method of using the advertisement system 100 in accordance with a second embodiment. In certain embodiments, such as described above, the broadcast system 104 may communicate or otherwise be directly communicably coupled with a consumer device 108. In a step 502, the method 500 may include receiving a code generation request in a form of call-to-action details 201. Then, in step 504, a code may be returned in the form of a call-to-action code 202, which may include instructions for integration with one or more third-party applications. Preformatted data containing the call-to-action code 202 may be sent in step 506. For example, in certain embodiments, the preformatted data may comprise RDS data, such as described above. Alternatively, the preformatted data may comprise any appropriately desired form or standard data protocol. In step 508, the preformatted data is received. In certain embodiments, the preformatted data is received at a receiver 106, such as a radio and a television, or other device capable of receiving content and/or a signal from a broadcast system 104. In certain embodiments, the preformatted data may be sent directly to a consumer device 108.

In step 510 it is determined whether an action has been taken by an end user. For example, it may be determined whether the user has engaged or otherwise pressed a button. Alternatively, it may be determined if the end user has taken an action on the consumer device 108, such as opting into an advertisement using an application of the consumer device 108. If no action has been taken by the end user, then the method ends in step 512. If, however, the end user has taken an action such as pressing a button or otherwise opting-in to receive data based on the advertisement, then in step 514 data is sent to the consumer device 108. In certain embodiments, the data may be sent to a wireless chip, such as a Bluetooth® or other wireless chip of the consumer device 108. The data may be transferred to an application of the consumer device 108 where it is parsed and added to the application of the consumer device 108 in step 516. Then, in step 518, it is determined whether the end user has made a decision in the application of the consumer device 108. For example, has the end user chosen to store the advertisement locally, integrate it with an application of the consumer device 108, or notify a third-party. In step 520, an action may be taken based on the decision.

Figure 6:
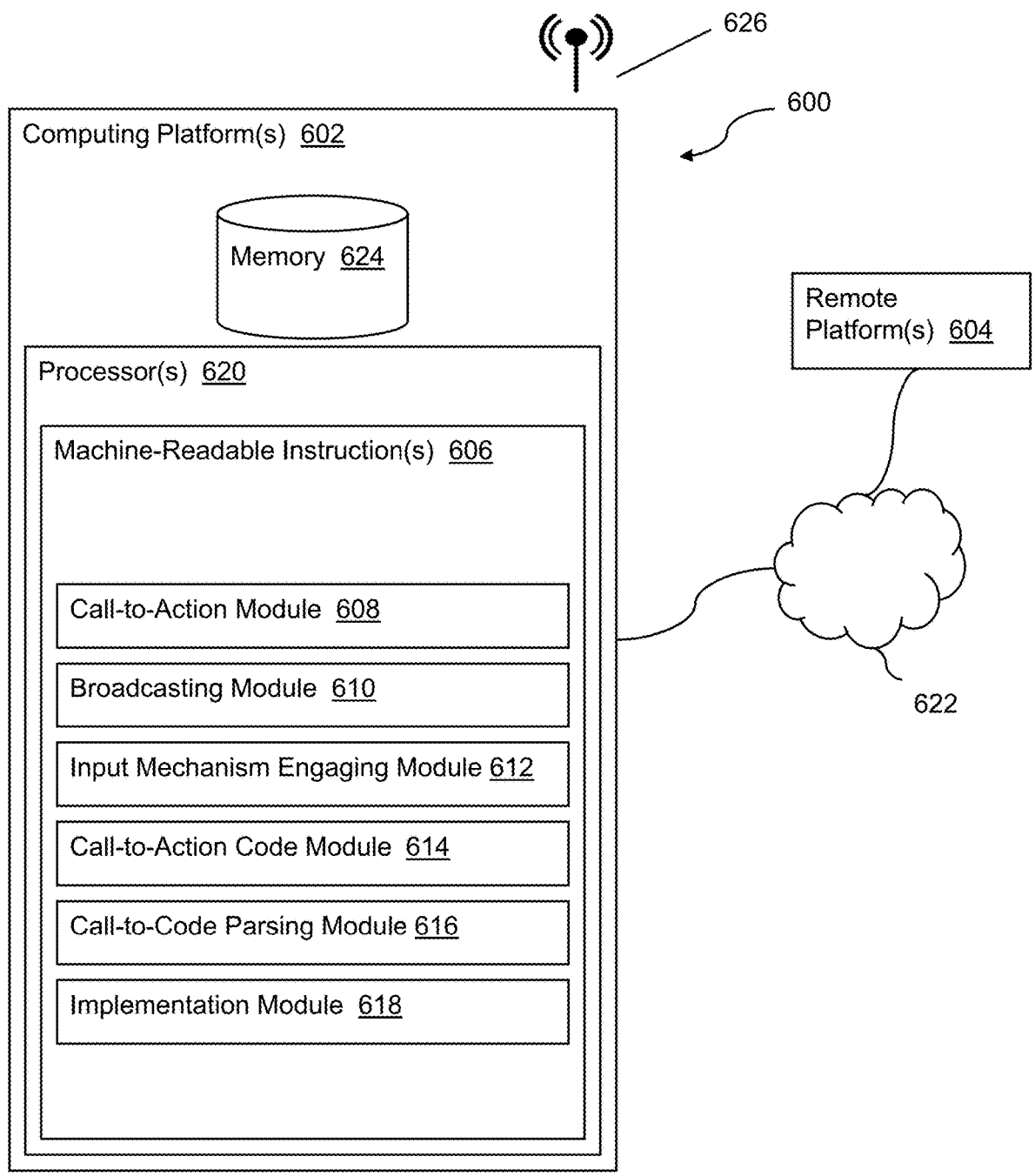
FIG. 6 is a schematic illustrating another embodiment of an advertisement system, in accordance with the present technology.

FIG. 6 illustrates an advertisement system 600, in accordance with certain embodiments. In some cases, the advertisement system 600 may include one or more computing platforms 602. The one or more computing platforms 602 may be communicably coupled with one or more remote platforms 604. In some cases, users may access the advertisement system 600 via remote platform(s) 604 through a networked environment 622.

The one or more computing platforms 602 may be configured by machine-readable instructions 606. Machine-readable instructions 606 may include modules. The modules may be implemented as one or more of functional logic, hardware logic, electronic circuitry, software modules, and the like. The modules may include a call-to-action module 608, a broadcasting module 610, an input engaging module 612, a call-to-action code module 614, a call-to-code parsing module 616, an implementation module 618, and/or other modules.

The call-to-action module 608 may be configured to receive call-to-action details 201 and return a call-to-action code 202 with one or more call-to-action details 201. The broadcasting module 610 may be configured to transmit an advertisement with an embedded call-to-action code 202 to a receiver 106. The input engaging module 612 may be configured to be selectively engaged by a consumer. Based on an engagement of the input engaging module 612, a call-to-action code module 614 is configured to send a call-to-action code 202 to receiver 106 or a consumer device 108. The call-to-code parsing module 616 may parse the call-to-action code 202 at the consumer device 108 with a software application. The implementation module 618 may be configured to implement one or more call-to-action instructions of the call-to-action code 202 at the consumer device 108.

In certain embodiments, the one or more computing platforms 602, may be communicatively coupled to the remote platform(s) 604. In some cases, the communicative coupling may include communicative coupling through a networked environment 622. The networked environment 622 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 602 and remote platform(s) 604 may be operatively linked via some other communication coupling. The one or more computing platforms 602 may be configured to communicate with the networked environment 622 via wireless or wired connections. In addition, in an embodiment, the one or more computing platforms 602 may be configured to communicate directly with each other via wireless or wired connections. Examples of one or more computing platforms 602 may include, but are not limited to, smartphones, wearable devices, tablets, laptop computers, desktop computers, Internet of Things (IoT) device, or other mobile or stationary devices. In an embodiment, the advertisement system 600 may also include one or more hosts or servers, such as the one or more remote platforms 604 connected to the networked environment 622 through wireless or wired connections. According to one embodiment, remote platforms 604 may be implemented in or function as base stations (which may also be referred to as Node Bs or evolved Node Bs (eNBs)). In other embodiments, remote platforms 604 may include web servers, mail servers, application servers, etc. According to certain embodiments, remote platforms 604 may be standalone servers, networked servers, or an array of servers.

The one or more computing platforms 602 may include one or more processors 620 for processing information and executing instructions or operations. One or more processors 620 may be any type of general or specific purpose processor. In some cases, multiple processors 620 may be utilized according to other embodiments. In fact, the one or more processors 620 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 620 may be remote from the one or more computing platforms 602, such as disposed within a remote platform like the one or more remote platforms 604 of FIG. 6.

The one or more processors 620 may perform functions associated with the operation of the advertisement system 600 which may include, for example, precoding of antenna gain/phase parameters, encoding and decoding of individual bits forming a communication message, formatting of information, and overall control of the one or more computing platforms 602, including processes related to management of communication resources.

The one or more computing platforms 602 may further include or be coupled to a memory 624 (internal or external), which may be coupled to the one or more processors 620, for storing information and instructions that may be executed by one or more processors 620. Memory 624 may be one or more memories and of any type suitable to the local application environment and may be implemented using any suitable volatile or nonvolatile data storage technology such as a semiconductor-based memory device, a magnetic memory device and system, an optical memory device and system, fixed memory, and removable memory. For example, memory 624 may consist of any combination of random access memory (RAM), read only memory (ROM), static storage such as a magnetic or optical disk, hard disk drive (HDD), or any other type of non-transitory machine or computer readable media. The instructions stored in memory 624 may include program instructions or computer program code that, when executed by one or more processors 620, enable the one or more computing platforms 602 to perform tasks as described herein.

In some embodiments, one or more computing platforms 602 may also include or be coupled to one or more antennas 626 for transmitting and receiving signals and/or data to and from one or more computing platforms 602. The one or more antennas 626 may be configured to communicate via, for example, a plurality of radio interfaces that may be coupled to the one or more antennas 626. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods may be made within the scope of the present technology, with substantially similar results.

What is claimed is:

1. A system, comprising:
an administration server configured to receive call-to-action details for an outgoing message, generate a unique call-to-action code based on the call-to-action details, and transmit the unique call-to-action code to a broadcast system;
the broadcast system in communication with the administration server, the broadcast system configured to receive the call-to-action code from the administration server and transmit a message with the call-to-action code to a receiver, the broadcast system including a radio data system configured to transmit the message with the call-to-action code, the broadcast system comprises one of a radio station, a television station, and a streaming service;
the receiver in communication with the broadcast system, the receiver including one of a radio or a television, the receiver configured to receive the message with the call-to-action code and transit the message with the call-to-action code to a consumer device, the receiver having an opt-in mechanism configured to be selectively engaged by a consumer; and
the consumer device in communication with the receiver and the administration server, the consumer device configured to receive the call-to-action code from the receiver when the consumer has engaged the opt-in mechanism, the consumer device having a software application configured to parse the call-to-action code with the administration server into call-to-action instructions, the software application further configured for the consumer to selectively choose which call-to-action instructions to integrate into call-to-action details within a third-party application of the consumer device, the software application including a graphical user interface (GUI) which permits a consumer to interface with the software application and the call-to-action details, the GUI permitting the consumer to selectively allow the call-to-action instructions to integrate the call-to-action details into a third-party application, the GUI allowing the consumer to delete, mark as read, or mark as remind later with respect to the call-to-action instructions and details, the software application utilizing a TAG variable to determine the appropriate third-party application to be integrated with the call-to-action details,
wherein the administration server is configured to collect and store data based on the call-to-action code parsed at the consumer device and the stored data is downloadable from the administration server.

2. The system of claim 1, wherein an application programming interface is configured to upload the call-to-action details to the administration server.

3. The system of claim 1, wherein the message with the call-to-action code is an advertisement.

4. The system of claim 1, wherein the opt-in mechanism comprises one of a pushable button and a remote control.

5. The system of claim 1, wherein the one or more TAG variables include a member selected from a group consisting of a phone number variable, an address variable, a charity variable, a fundraiser variable, and combinations thereof.

6. The system of claim 1, wherein the consumer device comprises one of a smartphone, a tablet, and a personal computer.

7. A method of using an advertisement system, the method comprising the steps of:
providing an advertisement system having an administration server, a broadcast system, the broadcast system including a radio data system configured to transmit a message with a unique call-to-action code, the broadcast system comprises one of a radio station, a television station, and a streaming service, a receiver including an opt-in mechanism, the receiver including one of a radio or a television, and a consumer device having a software application, the software application including a graphical user interface (GUI) which permits a consumer to interface with the software application, wherein the administration server is configured to collect and store data based on the call-to-action code parsed at the consumer device and the stored data is downloadable from the administration server;

transmitting, by the broadcast system, an advertisement with the call-to-action code including call-to-action details to the receiver;

receiving, by the receiver, the advertisement with the call-to-action code;

broadcasting, by the receiver, the advertisement with the call-to-action code to a consumer;

selectively engaging, by the consumer, the opt-in mechanism of the receiver;

transmitting, by the receiver, the call-to-action code to the consumer device;

parsing the call-to-action code, by the software application and the administration server, to call-to-action instructions; and selectively allowing, by the consumer using the GUI of the software application, call-to-action details to integrate into a third-party application, the GUI allowing the consumer to delete, mark as read, or mark as remind later with respect to the call-to-action instructions and details, wherein the software application utilizing a TAG variable to determine the appropriate third-party application to be integrated with the call-to-action details.

8. The method of claim 7, further comprising generating a unique call-to-action code for the call-to-action details received at the administration server.

9. The method of claim 7, further comprising, at the software application categorizing the call-to-action details according to one or more TAG variables.

10. The method of claim 9, further comprising grouping the one or more TAG variables based on the third-party application.

11. The method of claim 7, further comprising selectively engaging, by the consumer, receipt of a code including a member of a group consisting of a current call-to-action code, a previous call-to-action code, a future call-to-action code, and combinations thereof.

12. He method of claim 11, further comprising storing the code on a server.

13. The method of claim 12, further comprising parsing the code stored on the server by the software application and the administration server, and selectively allowing, by the consumer using the software application, the call-to-action instructions to integrate the call-to-action details into a third-party application.

14. The method of claim 7, further comprising at the software application, marking the call-to-action details as one of read and to be read.

* * * * *